United States Patent [19]
Wyss

[11] Patent Number: 5,113,961
[45] Date of Patent: May 19, 1992

[54] TRACTOR AND TRAILER COMBINATION AIR CUSHIONED VEHICLE

[76] Inventor: John R. Wyss, 4020 148th Ave. NE. Suite F, Redmond, Wash. 98052

[21] Appl. No.: 553,332

[22] Filed: Jul. 17, 1990

Related U.S. Application Data

[63] Continuation-in-part of Ser. No. 334,727, Apr. 7, 1989, abandoned.

[51] Int. Cl.$^5$ ............................................... B60V 1/14
[52] U.S. Cl. .................................... 180/116; 180/7.1; 180/13
[58] Field of Search ...................... 180/7.1, 7.2, 13, 21, 180/186, 116; 280/205, 206; 301/1, 5 R, 105 R, 111; 305/60

[56] References Cited

U.S. PATENT DOCUMENTS 3,173,510  3/1965  Smith ............................. 180/233 X
4,045,096  8/1977  Lidou ............................. 301/5 R X

FOREIGN PATENT DOCUMENTS

0203401  8/1988  Japan ................................ 301/5 R
90/05070  5/1990  PCT Int'l Appl. ................. 301/5 R Primary Examiner—Kenneth R. Rice
Assistant Examiner—Victor E. Johnson

[57] ABSTRACT

Two wheels of different modes are provided which add guidance capabilities to air cushioned vehicles. A tractor utilizes the wheel of the first mode, a wheel mounted upright upon a hollow tubular hub, being a half-torus. A trailer utilizes the wheel of the second mode, a wheel mounted upright upon a sphere which is cut off at the base to allow for ample platform clearance. Both vehicles are air cushioned, enabling them to hover above a support surface. Steering is affected by directing the tractor vehicle with the aid of a novel curved gear series on the inside rim of the wheel of the first mode. Twisting action upon the rim and wheel resulting from stress created between the steering sprocket and a drive sprocket, being synchronized when normal by a timing belt. The steering sprocket is effected by operator control and encounters the curved portions of the special gear teeth, thereby causing the tractor to turn. The wheels of both modes can be tilted by the operator's actions. Pressure differences in opposite chambers formed between the hub structures of the wheels and the outer shells at the sides of both wheels occur as fluid pressure is released from valves situated at the sides of both wheels in greater proportion on one side or the other.

4 Claims, 6 Drawing Sheets

FIG 6
FLOW DUCT

TRACTOR AND TRAILER COMBINATION AIR CUSHIONED VEHICLE

BACKGROUND AND TECHNICAL FIELD

This application is a C.I.P. of Ser. No. 334,727 filed Apr. 7, 1989, now abandoned.

This invention relates to guidance control methods for air cushioned vehicles, particularly those designs including one or more wheels promoting traction and maneuverability, said wheels being mechanically coupled to steering means such that a driver or operator can directly control the movements of the craft. More particularly the present invention relates to a guidance system for an air cushion vehicle which is directed and powered by tractor means which pull and direct a trailer vehicle, add traction, guidance, control and utility to the vehicle and enhance its ability to maneuver and carry passengers and a load.

A "combination" is referred to in this disclosure as a tractor and trailer combination air cushioned vehicle, hitched together in typical fashion.

An air cushioned vehicle operates by suspending its weight upon a fluid cushion which is generated by a motor and fan, and thence directed downward against a support surface, such as the ground beneath the craft.

Fluid pressure is generated by known motor powered means, and a flow duct directs the fluid pressure to a plenum chamber within the lower periphery of the vehicle structure, and is skirted with light flexible material to enhance the cushioning effects of the fluid pressure against the support surface. These technologies are well known and used in present air cushioned vehicle designs. To simply hover in place does not provide much utility, so methods have been devised whereby directional steering is made possible. Problems in overcoming ineffectiveness in almost every prior design of a guidance system for air cushioned vehicles have kept such craft limited to only a few practical uses.

The use of a wheel to overcome handling problems of such craft was foreseen by Simon, U.S. Pat. No. 3,227,234, and to steer and drive the vehicle by Smith, U.S. Pat. No. 3,173,510, and improved upon to some degree by deCoiselet, U.S. Pat. No. 4,427,086.

However, as discussed in my filing, Ser. No. 334,727 of which this application is a C.I.P., the adaptations of wheels to air cushioned vehicles in prior art do not effectively conquer the actual effects of momentum upon a rapidly moving vehicle, especially if the vehicle carries a load and if traction is poor. An upright wheel of an air cushioned vehicle tends to be lifted by the air cushion and has poor traction against the support surface. Today's general transportation needs require that high speeds be attained and the craft must remain under the driver's total control and easily negotiate turns.

My two modes of guidance wheels cooperate with the momentum of the craft, rather than contradict its momentum, allowing normal equalization of the vehicle load and efficient guidance of its momentum as the vehicle is in motion, being operated under typical day-to-day conditions on city roads and highways, making the air cushioned vehicle more practical as an everyday mode of commuting and transportation for all purposes.

SUMMARY OF THE INVENTION

Upon an air cushioned vehicle is suspended at least one of two modes of wheels, each having a distinct and separate mode of operation, there being a wheel of the first mode guiding the tractor, and a wheel of the second mode guiding the trailer, hitched together in combination.

Both modes are novel designs which incorporate pneumatic forces to provide guidance actions for the vehicle. The fluid pressure generated to provide cushion for the craft is used to provide pneumatic pressure in chambered areas at the opposing sides of the wheels to effect their tilting upon the air cushioned vehicle structure.

As fluid pressure builds, the craft will lift due to the air cushion reacting to the support surface. Release valves positioned at the left and right sides of the wheels can be controlled to allow pressure to exit from the chambered areas at the sides of the wheels through the release valves, and this will cause the lift to be diminished, and the craft lowers, succumbing to the forces of gravity due to less fluid pressure cushion.

When the lift is diminished, more wheel traction is thence afforded to the vehicle by virtue of the increased wheel contact to the support surface. Therefore, the operator dictates the degree of wheel traction and air cushion lift when the vehicle is in operation.

Operator controls allow the driver to do the following: Vary the levels of motor power to air cushion pressure and the drive wheel separately; control the said pressure release valves; control the steering actions of the steering sprocket of the wheel of the first mode.

A series of continuous special curved gear teeth lining the inner rim of the wheel of the first mode mesh with the teeth of the steering sprocket, and depending upon the position of the steering sprocket in relation to its placement upon the special curved teeth of the rim, the rim experiences twisting action through the frame of the sprocket mount, also being a motor mounting cradle, and the wheel turns and directs the tractor's heading.

The wheel of the first mode is supported by a hub structure, being a half torus, a half donut-like surface of revolution produced by rotating a circle, the size being slightly smaller than the inside diameter of the rim through 180 degrees in space about a line in its plane not passing through the circle, such that a half of a complete anchor ring is formed. The rim and tire, revolve freely about said hub which is suspended upon the tractor portion of the air cushioned combination vehicle. The tractor is hitched to the trailer vehicle portion by typical hitching means to combine the two vehicle portions, so that the wheel of the first mode may guide the trailer that is hitched to it.

My design provides for the wheel of the first mode to be powered, and thus the wheel of the first mode is a drive wheel and a steering wheel of the vehicle.

The wheel of the second mode does not have directional steering means, only the ability to tilt side to side diagonally in relation to its normal axis when upright, effected by forces upon the wheel resulting from differences in pneumatic pressures within chambers at each side of the wheel above the equator of its accompanying spherical hub structure. This hub is a perfect sphere with a portion below a horizon above the base, and below the equator removed for clearance of the support surface.

This wheel's action aids greatly in guidance of the craft because it takes advantage of the ability of the air cushioned vehicle to move sideways easily. This advantage translates to faster and better vehicle response, similar to the advantages known to be evident in handling a long truck and trailer combination when steering guidance is applied at the back wheels and is controlled independently of the front wheel's steering. Some typical well known vehicles allow for a second driver with steering apparatus provided at the rear of the combination vehicle, such as with "hook-and-ladder" type firetrucks.

This wheel of the second mode provides a similar benefit in guidance of the combination air cushioned vehicle by leaning into turns.

It is therefore an object of the present invention to provide an improved guidance and traction system for the air cushioned vehicle which makes use of at least one of two adaptations of a wheel, and there being a wheel of a first mode, and a wheel of a second mode.

It is an object to control tilting actions of both wheels with air movement and relative pressure differences between pressurized chambers at the sides of the wheels, by incorporation of the fluid pressure of the air cushioned vehicle present under normal operation. It is also an object to accomplish improved handling in air cushioned vehicles by combining the actions of tractor guidance of a wheel of a first mode, having means of being steered, with trailer guidance of a wheel of a second mode, which tilts on its axis and aids in directional control.

It is a further object that the wheel of the first mode is steered directionally by operator control of a steering sprocket which meshes with special curved teeth, all identical, which line the inner rim of the wheel in a continuous series, causing twisting action upon the rim and forces the wheel assembly of the first mode to be turned directionally, resulting in guidance at the hitch connecting it to the trailer body of the combination vehicle, from where the operator controls said steering, which varies in degree according to the placement of the steering sprocket in relation to the axis, being the center of the curved gears, and the curvature of the specially shaped gears.

It is an object to show how said placement of the steering sprocket left or right of the common axis and the curvature of the specially shaped teeth determines the degree of turn effected upon the wheel of the first mode, and to establish applicable mathematical equations relating said placement and curvature to craft heading coordinates to enable designers of these craft to establish detailed specifications through said equations.

It is a further object to mount the said steering sprocket with means for operator control to adjust said placement thereof such that the driver of the vehicle may readily effect changes in the directional heading of the vehicle.

An advantage of combining the two independent actions of pneumatic tilting and directional turning ability effected by my special steering sprocket and specially curved gearing arrangement is that the wheel of the first mode both tilts and turns directionally, each said action being totally independent of the other, yet simultaneous.

Therefore, by operator control, the traveling vehicle remains normal in relation to all forces acting upon the vehicle's load when operated under typical driving conditions by a capable driver, thus providing superior guidance for an air cushioned vehicle.

Means of constructing the body shell and frame are known art. Lightweight fiberglass, laminate or plastic construction is durable and easily formed. Designs are numerous and can easily be varied to meet size and weight needs. Wheel structures and the apparatus of both modes of wheel action depend upon rigid construction because of the stress produced between road and vehicle. Rims and hub structures should be machined thin gauge stainless steel so as to be light and sturdy. The tubular half-torus shaped hub structure is hollow and is slit laterally to allow support shafts from the cradle and the teeth of the steering and drive sprockets to ride within the hub structure, and extend contact of the teeth of the sprocket to the rim. Rims spin about hub structures with the assistance of low friction bearings, ball and roller style. Tires are light, of vulcanized rubber, solid or inflatable. The outer shell of the craft, and outer pressurized chamber walls may be formed of any very light high impact plastic or fiberglass construction means, which serves as air cushioned platform in this embodiment and as the outer pressurized chamber walls.

A typical skirting for air cushion craft is in place around the outer perimeter of both tractor and trailer portions, and depending upon the quantity of the air flow, and the flow pressure retained within the plenum chamber, said skirting allows several inches of play between the craft and the support surface, permitting the raising and lowering of the wheels to contact the ground as wheel to support surface contact is desired.

Flow pressure within the plenum chamber, and directed against the support surface, is increased if power is increased to the fluid pressure producing means, generally a fan and motor. Fluid pressure is diminished by reduction of power and, or by, release of fluid pressure from the plenum or the chambers at the sides of the wheels, which are equipped with pressure relief valves on each side of each wheel variably controlled by the operator by release triggers at the steering handlebar.

The wheel of the first mode is a tractor wheel and is powered by motor means, such that the speed and direction of rotation is controlled by the vehicle operator. This first wheel and air cushioned platform and apparatus are the tractor portion of the combination vehicle, and are hitched by typical means to the trailer portion of the vehicle. The second wheel described is a guidance wheel for improved response of the trailer body of the combination air cushioned vehicle.

DESCRIPTION OF THE INVENTION

Figure 1A:
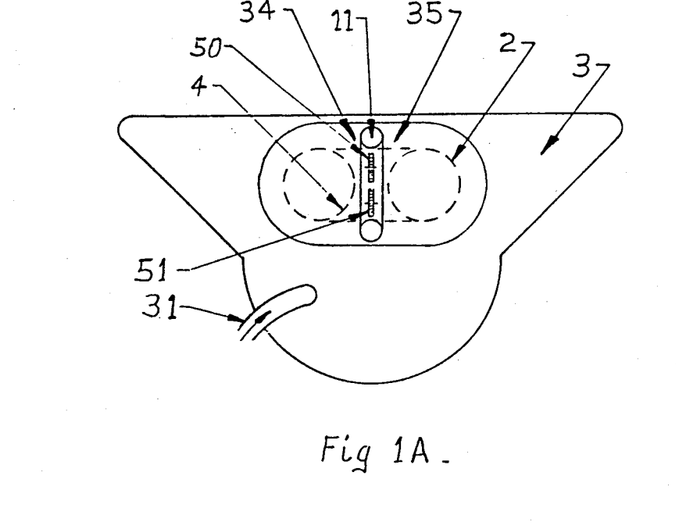
FIGS. 1a, 1b and 1c: The Wheel of the First Mode.
Figure 1B:
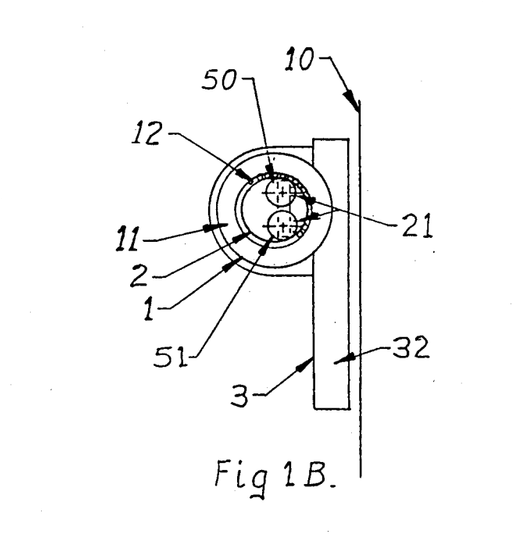
Figure 1C:
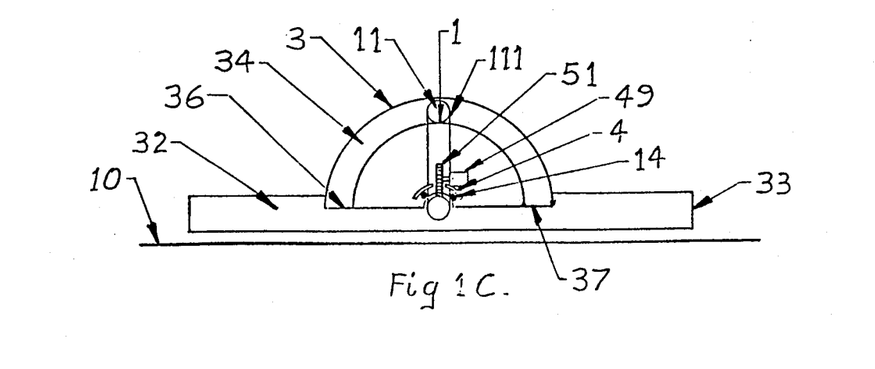

Turn now your attention to FIG. 1, an overview of the construction of the wheel of the first mode. A special rim, 1, with a tire, 11, together forming a torus shaped ring, is mounted upon a hollow tubular half-torus shaped hub structure, 2, which makes a perfect half torus, a half anchor ring, in a half circle, and is fixed upright upon and integrally joined by framework to the body, 3, of the tractor, being substantially an air cushioned platform of typical operation. The rim and tire revolve freely about the hollow half torus hub structure upon ball bearings, 12. Said body, 3, an air cushion platform, is equipped with a flow duct, 31, to receive fluid pressure generated by motor and fan means, 55, (shown in FIG. 6), a plenum chamber, 32, to capture and direct fluid pressure against the support surface, and a typical air cushion craft skirting, 33, all of which enable the craft to act as an air cushioned platform in support of the apparatus of the wheel of the first mode. As the plenum is filled with fluid pressure, the platform body, 3, is lifted and the tire, 11, is raised slightly and thus out of contact with the support surface, 10. A cradle, 4, rides inside the hub upon ball bearings, 14. On the cradle is mounted a steering sprocket, 51, drive motor, 49, and a drive sprocket, 50, and four supporting shafts, 44, which extend from supporting shaft sleeves, 45, on the cradle inside the hub (shown in FIG. 3) and which stabilize the cradle upon the flat sidewalls of the rim, 111, by extending downward from the cradle to the sides of the rim, through two slits, 21, which are cut laterally through the base of the hub to coincide with the anticipated sideways movement of the cradle. Supporting shafts, 44, are fitted with roller bearings, 41, and roll against the flat sides of the rim, 111, two shafts on each side of the rim at four equilateral positions. Supporting shafts, 44, extend through the slits, 21, and to shaft sleeves, 45, upon the cradle which fix the supporting shafts onto the cradle and hold them firmly.

An overall cover, 3, which fits closely over the wheel yet does not contact the wheel, embodies the outer shell of pressurized side chambers, 34, and 35, at the sides of the wheel, separated from the plenum chamber by rubberized membrane dividers, 36, and 37, at the base of the hub structure, extended across the length of the base of the hub structure, being one full membrane divider for each side, and connected to the rim of the base at the outer edges by rim clamps, 13, and by grommets, 70, to the support shafts, 44, so as to move with the cradle, 4, the purpose of which being to substantially separate the side chambers from the plenum chamber and provide differences in relative pressures at the sides of the wheel's upper portion, which will tilt the wheel to the left or right, so as to allow the driver to position the wheel diagonally while in operation. The full description of this pneumatic tilting action is in FIG. 5.

The apparatus allows the wheel to be tilted diagonally, and yet continue to freely spin upon the half-torus shaped hub, without loss of power. As tilting occurs, the motor and steering apparatus will also tilt to the extent that the wheel tilts, via said cradle mount such that the steering sprocket, motor and drive sprocket and the cradle all follow the diagonal tilt of the wheel which, from time to time an operator will opt for in driving the vehicle. The motor and power drive sprocket apparatus are mounted upon said cradle within the hollow hub, and mimic any diagonal action of the wheel, adding control when in use as a tractor guidance wheel for the combination.

Figures 2A, 2B, 2C, 2D:
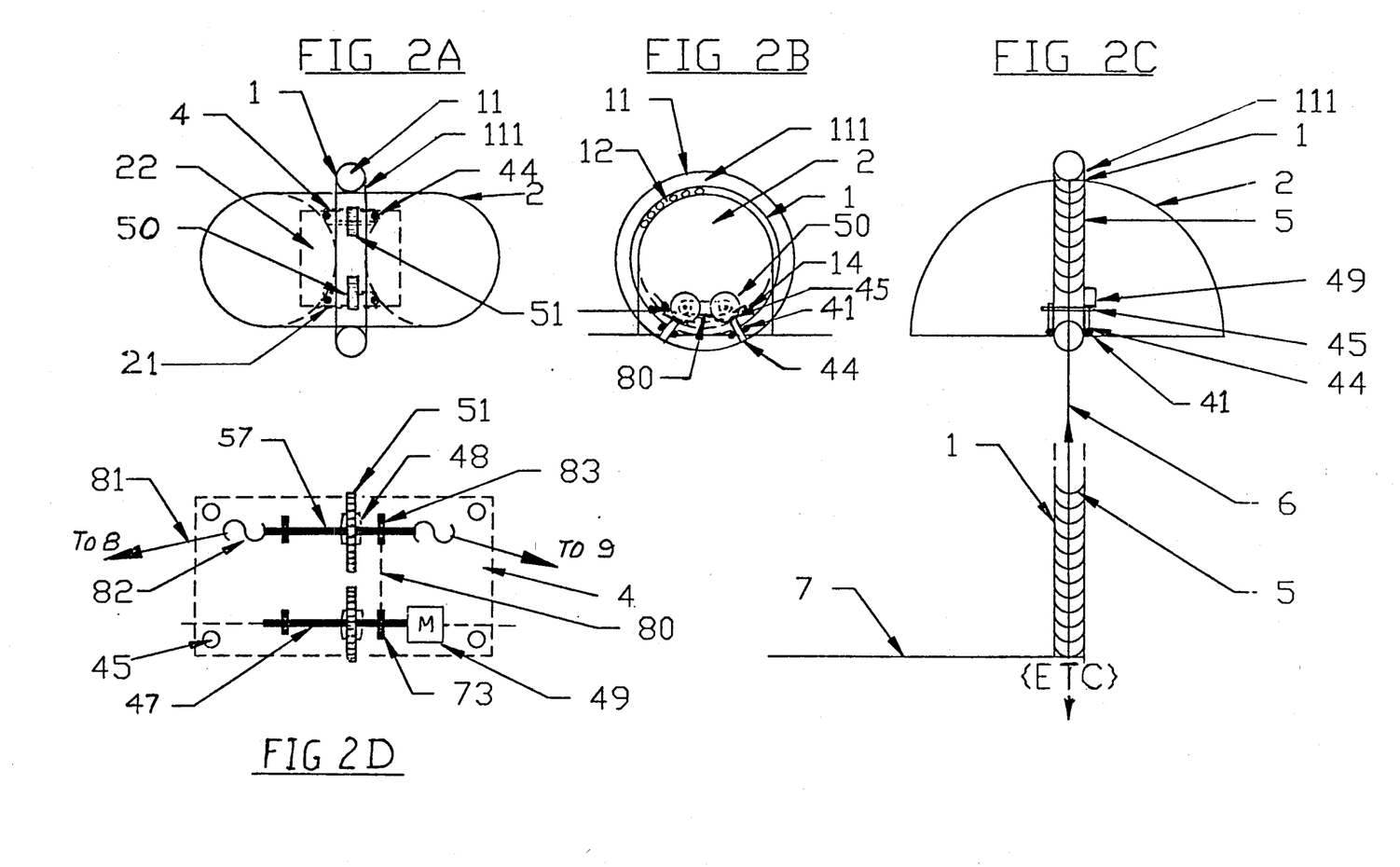
FIGS. 2a, 2b, 2c and 2d: Special Steering Apparatus Showing Curved Teeth.

Turn now your attention to FIG. 2. Within and lining the inside of the special rim referred to earlier are a continuous series of identical, specially curved gear teeth, 5, each tooth resembling a parabola, in continuous and identical parabolic-like segments lining the inside of the rim, (the exact curve design to be determined by mathematical formulae, and the desires of the user). Said parabolic-like segments, being gear teeth, 5, mesh and interact with the drive sprocket, 50, and the steering sprocket, 51. Said sprockets are typical flat gears, held by brackets on the cradle to contact the rim at the base of the inner rim, the drive sprocket is held by a drive shaft, 48, of the motor, 49, and brackets, 47, the steering sprocket is held by a sturdy yet flexible spring-rod shaft, 52, between brackets, 57, to permit some movement of the sprocket as it invokes its steering action upon the curved gears, which causes twisting of the rim. The spring-rod shaft prevents the sprockets from binding upon the curved teeth when the sprockets' teeth become slightly out of sync with each other, and permits the twisting, or turning action of the rim. Each sprockets' teeth mesh with the curved gears normally along the common axis, 6, of the curved gear teeth of the series lining the inner rim.

The sprockets are connected by a means of timing, such as a timing belt, 80, between timing gears, 73, of the drive shaft, and 83, of the spring-rod shaft of the steering sprocket, and are therefore substantially synchronized. Timing of the sprockets is necessary to achieve the twisting action which steers the vehicle, because it is conflict caused between the substantially synchronized sprockets that causes said twisting forces to the rim due to the change in the meshing of the steering sprocket against the curved teeth of the rim.

The exact curvature of the teeth will depend upon a variety of specific requirements, but working example shows that curved gear teeth shaped like parabolic segments will suffice to operate in the desired fashion, which requires that upon lateral movement of the steering sprocket left or right, along a common directrix, 7, being perpendicular to a common axis, 6, a twisting force is exerted upon the rim, a result of a degree of imperfectly synchronized meshing between the drive sprocket and the steering sprocket, which are synchronized when normal. Thus the wheel of the first mode and its entire apparatus, including the body of the air cushioned platform, turns in relation to the degree of curvature of the specially curved teeth at a path between where the driving sprocket is meshing, and the steering sprocket meshes, as controlled by operation of the steering handlebar.

The steering sprocket, 51, is mounted upon the cradle on a spring-rod shaft, 52, and held rotatably by two brackets, 57, mounted so as to allow for left and right movement, teeth of said sprocket staying meshed while being pulled laterally across the curved gears, which is the steering action, effected by the operator from the remotely placed handlebar, 8, via control linkage, 81, a flexible cable mounted such that turning the handlebar applies pulling pressure at the spring-rod of the steering sprocket, and pulls the sprocket in the same direction. Said spring-rod is mounted on the cradle to move left or right by action of the steering cable, 81, attached to the ends of the spring-rod by spinners, 82, and holds the steering sprocket centered, when normal, such that it rides substantially along and within the axis, 6, of the series of curved gear teeth of the rim, regardless of the tilt angle of the wheel. Similarly the motor shaft and two brackets, 47, hold the drive sprocket, 50, firmly in place on the cradle. The steering sprocket and drive sprockets mesh with the curved gears in the rim of the wheel through a wide slit, 22, at the lower center of the hollow half-torus hub structure, 2. The wide slit, 22, extends laterally along the lower center of the hub from its base at the far left to the far right, parallel to the slits the supporting shafts extend through. The slits allow the cradle, shafts, and apparatus of the steering and drive sprockets position to mimic the tilt angle of the wheel. The driver influences the directional heading of the tractor vehicle by a steering handlebar, 8, in front of the driver's seat, 9, both being located on the trailer portion of the combination vehicle, a separate air cushioned platform which is towed and guided by the tractor portion of the combination.

It is anticipated by the inventor that the handlebar could be located on the tractor portion, or that the tractor portion may act alone as a single wheel air cushioned vehicle merely by placing the steering handlebar and driver's seat on the tractor portion and eliminating the trailer and the wheel of the second mode.

The steering sprocket is in communication with the handlebar, 8, through a sturdy cable, 81, connected to the spring-rod shaft at the ends of the shaft by spinners, 82, such that the shaft rotates freely, and pulls the steering sprocket when the cable is pulled, such that the cable serves as steering linkage to pull the steering sprocket to the left or right. The left or right movement of the steering sprocket laterally across the curved gears then causes twisting between the two substantially synchronized sprockets' gear teeth at the rim as they attempt to correct the improper meshing caused by the steering sprocket's change in position in relation to the axis of the curved gear teeth lining the rim, and said twisting action between the sprockets thence forces the entire structure and apparatus of the wheel of the first mode including its air cushioned platform to be turned, according to the degree of lateral movement of the steering sprocket, and the shape of the curved gears as the steering sprocket deviates from the path of the common axis thereof. This turning of the wheel of the first mode affects the direction of pull that the tractor portion of the combination will thence effect upon the combination.

Figure 6:
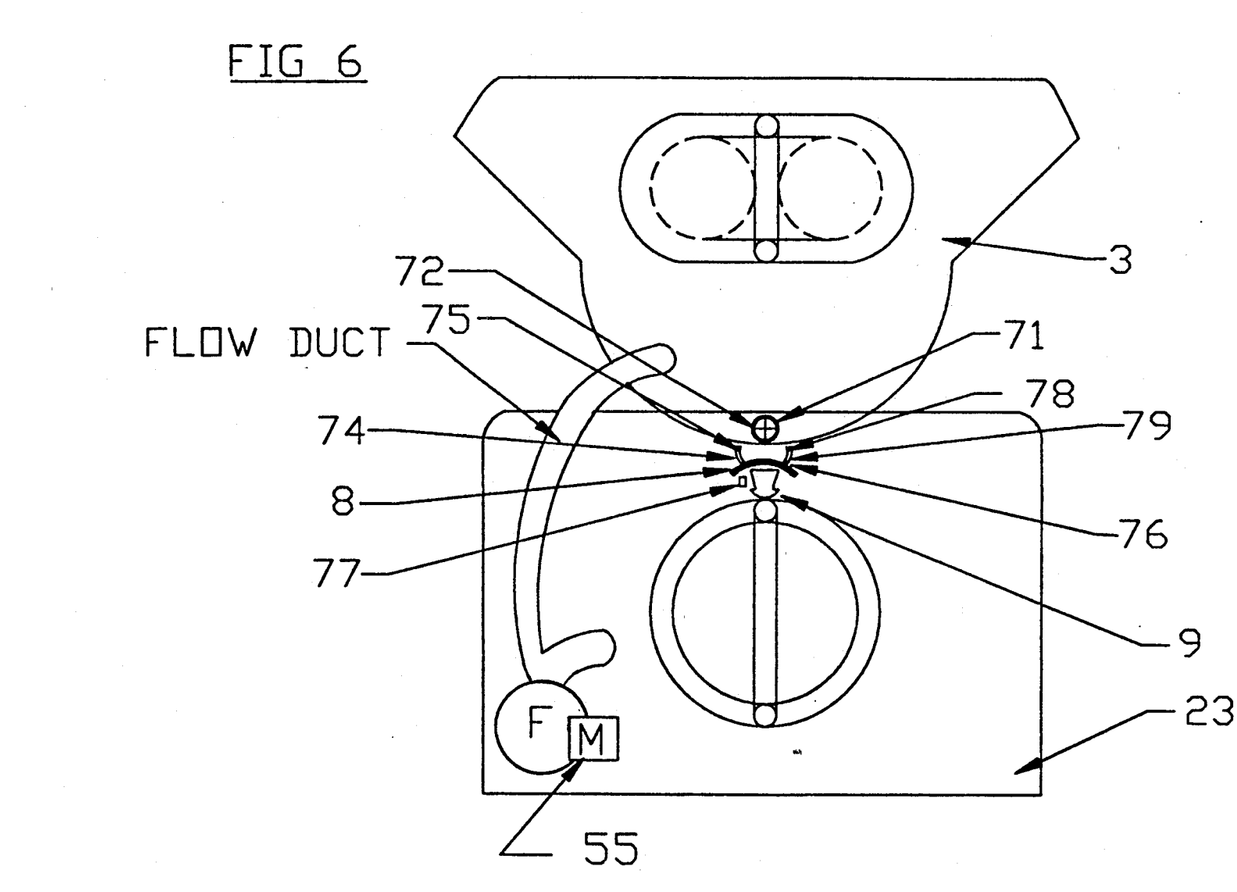
FIG. 6: Embodiment of Wheels Hitched Together in a Tractor and Trailer Combination Vehicle.

The entire vehicle, as shown in FIG. 6, is referred to as a "combination" and is a combination of the tractor and trailer air cushioned platforms and their apparatus as described herein.

Working with mathematics referred to in the appendix of this patent application, the following equations are found to apply regarding the curvature of gears of the inner rim and the directional heading the tractor will take in operation as the steering sprocket is shifted to the left or right.

A, B, C, D, E and F are constant coefficients, x and y are variables, a(x)squared=4py is the formula for said curve of the special gear teeth of the rim, however the rim, and thus the gear has a width of −L(less than)×(-less than)L; p is the focus and (O,O) is the origin, or the location of the steering sprocket, p=focus. The gear is curved as a conic section, notation being:

$$A(x)squared + Bxy + C(y)squared + Dx + Ey + F = O$$

To transform an equation of a curve from (x,y) to (x',y'), substitute for each variable in the equation of the curve its expression in terms of the new variables.

In translation, x=x'+h and y=y'+k, the new axes being parallel to the old axes and the new coordinates in terms of the old are (h,k). Furthermore, in rotation, x=x'cos@−y'sin@, and v=v'sin@+x'cos@, when @ is the angle of directional heading from normal in the tractor vehicle. Thus, a(x−h)squared+4py, and is the formula for the shape of the specially curved gears; O(less than)@(less than)90 degrees; O(less than)y(less than)h; Therefore, the rim will experience twisting to the degree @ when the steering sprocket is placed within the curved portion of the specially shaped gear teeth, left or right of the common axis of said teeth.

Figure 3A:
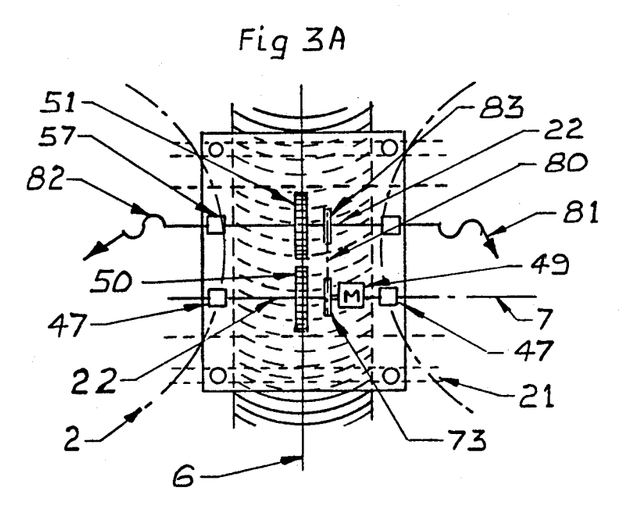
FIGS. 3a, 3b and 3c: Motor Apparatus Which Powers Wheel of the First Mode.
Figure 3B:
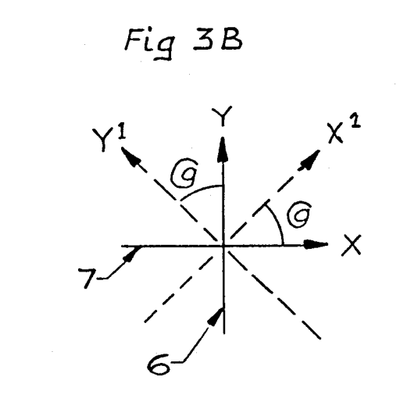
Figure 3C:
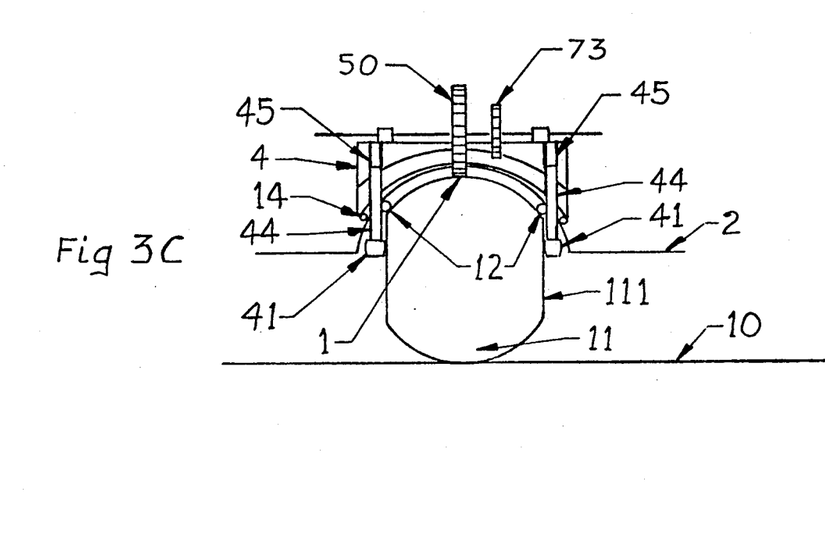

Turn now your attention to FIG. 3, where a detail of the motor drive and power transmission means of the wheel of the first mode are shown. This detail illustrates the spring-rod shaft, 52, the steering sprocket, 51, affixed thereto, capable of lateral movement as controlled through the steering cable, 81. Said spring-rod is rigid for control of the sprocket, yet must give way slightly such that binding does not occur as the sprocket effects the twisting action produced as it is moved laterally across the curved gears of the rim. For twisting to occur, a timing belt, 80, must synchronize both drive sprocket, 50, and steering sprocket, 51, resulting in said twisting action as a result of the stress of attempts by the sprockets to achieve normal meshing upon the curved gear teeth of the rim.

The motor, 49, is mounted on a cradle, 4, which rides upon ball bearings, 14, in a frame conforming to the shape inside of the hollow interior of the half-torus shaped hub structure, 2, of the wheel of the first mode. Through two lateral slits, 21, in the hub structure for the four supporting shafts, 44, that extend down from the cradle four roller bearings, 41, are held such that they ride vertically to the rim, two on each side for support. A flat, recessed surface, 111, lining the outer sidewall of the rim allows the roller bearings to ride smoothly and provide lateral support for the cradle normal to the rim, regardless of the tilt, which is anticipated in operation. This permits the motor cradle to follow and exactly mimic the tilting actions of the wheel, as controlled by relative pressures within the pneumatic chambers, the actions of which are further detailed in FIG. 5. While such tilting action of the wheel and motor cradle is effected, the entire powered drive sprocket and steering sprocket apparatus tilts in unison, and continues to engage power from the motor to the wheel, as it is tilted and in motion, as is anticipated in its operation.

Parallel and centered between the two lateral slits which allow for two shafts each with roller bearings extending from the cradle downward to the sides of the rim is a wider slit opening, 22, which allows for the steering and drive sprockets to be in contact with the special curved teeth lining the inner rim, therefore enabling lateral movement of the sprockets, with the cradle while retaining full contact upon the rim, and thus twisting the entire apparatus of the wheel, said twisting forces being created at the intersection of the steering sprocket and the special curved gear teeth when the operator exerts forces at the handlebar to pull the steering sprocket from points centered upon the axis, 6, which would effect no turn, to points either left or right adjacent of the common axis of the special curved gear teeth which line in a continuous series the inner rim of the wheel of the first mode.

Broken lines in the co-ordinates graph of FIG. 3 illustrate examples of left and right turns caused by the operator's manipulation of the steering sprocket, the exact positioning of which, is controlled from the steering handlebar, in relation to the force applied laterally upon the steering sprocket, and the nature of the curve of the special teeth, as related in the mathematical equations shown earlier which translate the shape of the curved gear teeth, and the position of the steering sprocket to an angle of change in directional heading of the tractor air cushioned vehicle.

Twisting forces to the tractor thence manifest themselves by causing the tractor to turn in relation to the forces exerted by the operator at the handlebar. The tractor portion turns, and pivoting upon the hitch which connects the tractor portion to the trailer portion of the combination vehicle, thence leads the trailer portion into the direction of the turn.

Figures 4A, 4B:
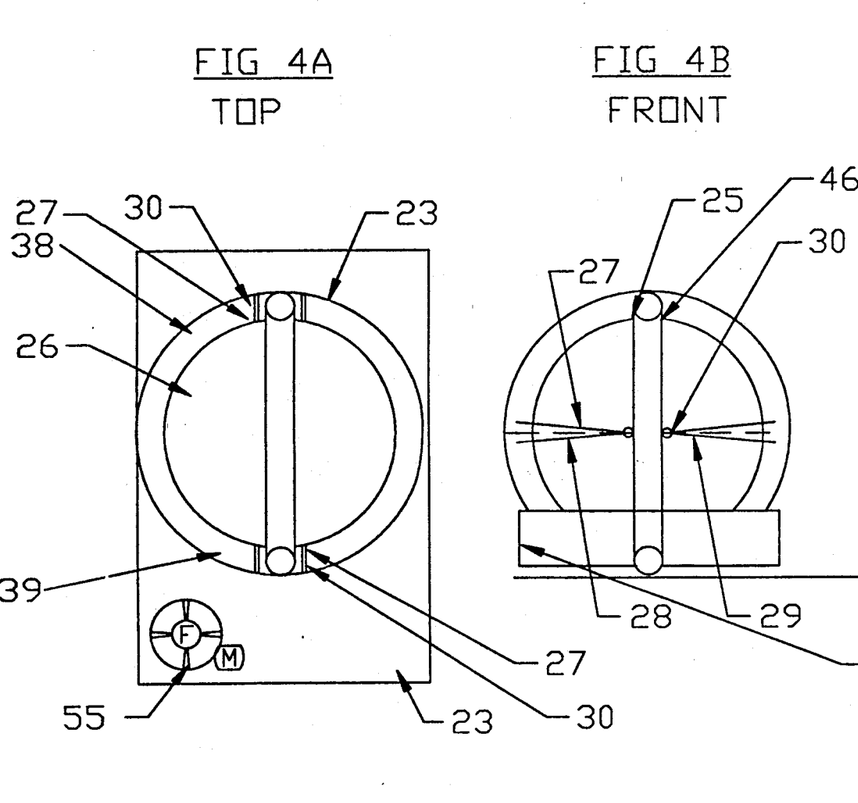
FIGS. 4a, 4b and 4c: The Wheel of the Second Mode.
Figure 4C:
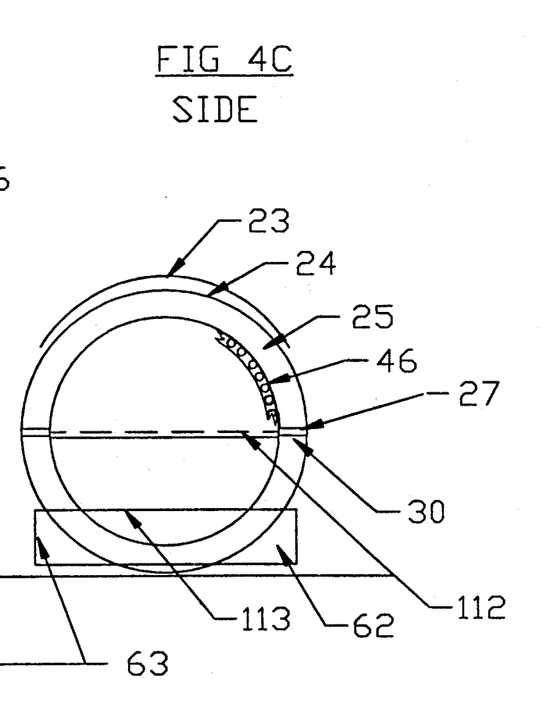

Turn now your attention to FIG. 4, which illustrates the wheel of the second mode. Like the wheel of the first mode, a close fitting cover, 23, being the air cushioned platform body, is provided over the apparatus as the trailer body and air cushioned platform and does not contact the wheel directly, yet embodies the outer enclosure of the pressurized chambers, 38 and 39, at the sides of the upper portions of the wheel so as to tilt the wheel as desired, and houses the apparatus of the wheel of the second mode. The action of tilting by use of the pressure differences within the chambers at the sides of the wheel will be further described in FIG. 5.

This wheel aids in the guidance of the combination vehicle because it helps direct the trailer portion as it follows the tractor portion, and provides positive traction to the support surface in the trailer portion.

The wheel of the second mode comprises a tire, 24, upon a circular rim, 25, which is equipped with ball bearings, 46, about the inner surface. Assisted by said bearings, the rim rides freely upon the outer surface of a spherical hub, 26, being a sphere (referred to as the spherical hub structure) with a zone being defined by the entire portion above the equator, 112, and that portion above a horizon, 113, below the equator, (to be established precisely by determining desired clearance between the support surface and the base of the sphere). The base portion of the sphere is removed at said horizon, which becomes the base to allow for vehicle clearance as the wheel tilts while in motion. The spherical hub, 26, is coupled with the body of the trailer portion of the air cushioned vehicle, 23, which comprises an air cushioned platform equipped with fluid pressure generation means, 55, being a motor and fan, a plenum chamber, 62, and a skirt, 63. The inner surface of the rim must provide for a low friction relationship such as the ball bearings, 46, between the rim and the sphere such that the wheel assembly revolves freely in an upright position about the spherical hub structure, 26, and is firmly held in its upright state by four lateral supports, 27, which are equipped with roller bearings, 30, to roll freely on both sides of the rim at the equator, 112, of the sphere, 26, at its front and rear. Thus the wheel freely spins about the spherical hub structure, 26, supported laterally by the four lateral supports, 27, with roller bearings, 30, on each side of the rim, on the equator of the sphere, front and rear, and supported vertically by the spherical hub structure which holds the rim such that the rim rotates, yet is firmly suspended upright both above and below the equator. Though a portion of the complete sphere below the equator is removed for ground clearance due to the normal rise and fall due to lift and the angle of the rim and tire as tilted, as is expected in operation, enough hub remains for vertical support of the rim and thus, the wheel of the second mode is provided for traction and guidance of the trailer vehicle.

Figure 5A:
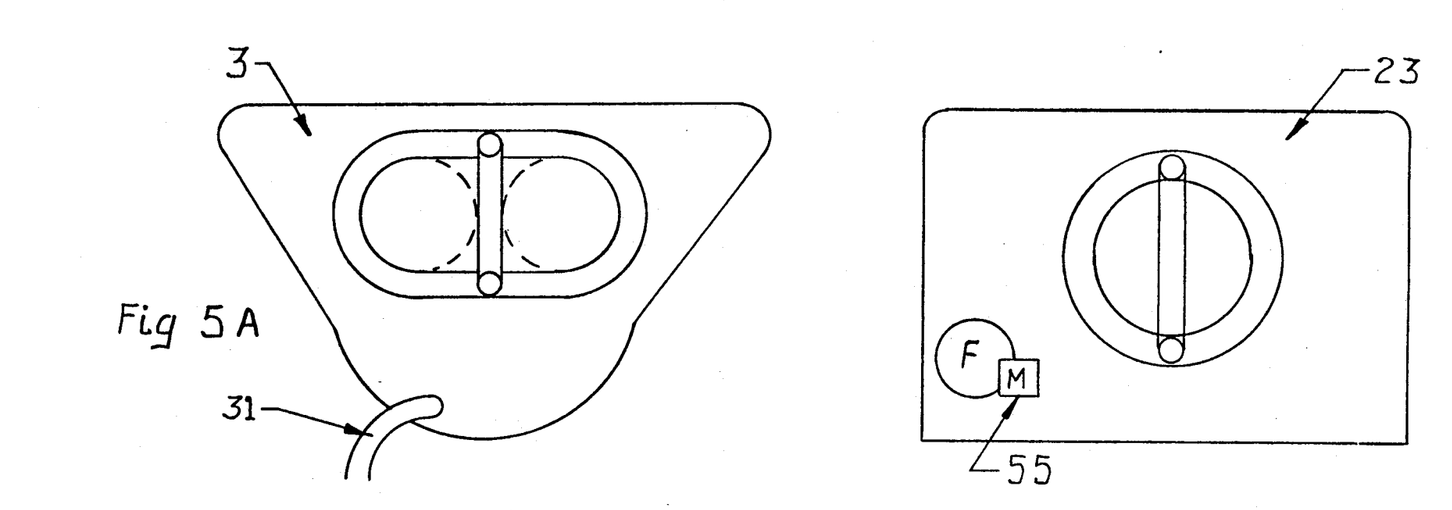
FIGS. 5a and 5b: Pneumatic Chambers at Sides of Wheels and Release Valves for Evacuation.
Figure 5B:
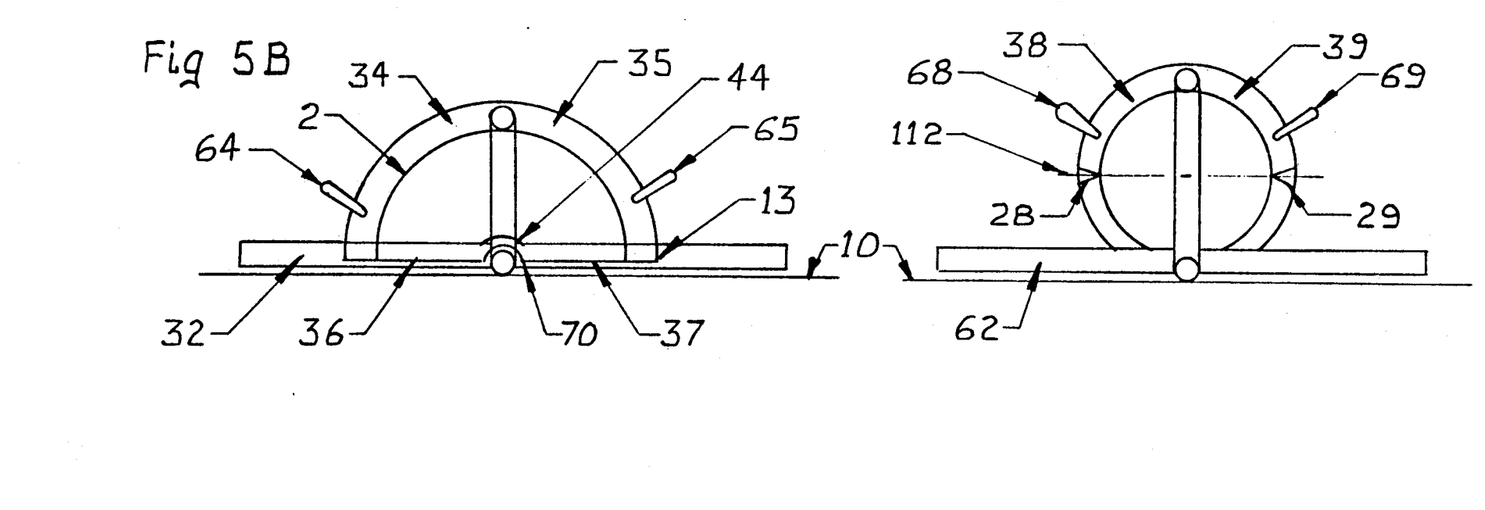

At the equator are dividers, 28 and 29, to isolate the pressurized chambers at the sides of the rim and tire from the plenum chamber, and provide for the relative pressure differences at the top of the wheel which effect the pneumatic tilting action detailed in FIG. 5.

Means of adding motor power and drive means to the wheel of the second mode are easily adapted by adding drive gearing at the side of the rim, yet in this embodiment such means were not deemed necessary to illustrate the novel features of the invention detailed herein.

Turn your attention now to FIG. 5, showing the tilting action of both wheels, as effected by the pressurized chambers at the sides of the wheel of the first mode, and at the sides above the equator of the wheel of the second mode. As mentioned earlier, both wheels' apparatus are contained within closely fitted, yet not air tight, outer shells, 3 and 23, being the air cushioned platform structures conforming to the shape of the particular wheel and allowing for fluid pressure to extend from the plenum chambers, 32 and 62, of the air cushioned platforms through the narrow spaces between tire surfaces and outer shells, into the pressurized chambers, 34 and 35 on the wheel of the first mode and 38 and 39 at the sides of the wheel of the second mode. The outer shell of the chambers substantially being or supporting the outer body of the air cushioned platform. Within the outer shells, 3 and 23, being the air cushioned vehicle bodies, the fluid pressure generated by the motor and fan, 55, of the air cushioned platforms (both platforms receive fluid pressure from one motor and fan, 55) fills the chambered areas at the sides of the wheels, 34, 35, 38 and 39. In the wheel of the second mode, only the portion above the equator, 112, at the sides are exposed to relative pressure differences.

In the wheel of the first mode, elastic membranes, 36 and 37, extend across the base of the hub structure, 2, clasped at the outer edge of the base by a wide clamp, 13, and extended to the cradle and hooked by grommets, 70, to the supporting shafts, 44, and serve to separate the plenum chamber, 32, from the side chambers, 34 and 35. In the wheel of the second mode, dividers, 28 and 29, at the equator, 112, serve to substantially separate the plenum chamber, 62, from the side chambers, 38 and 39. The purpose of said dividers of the second wheel mode and the membranes of the first wheel mode is to isolate, to the greatest effect possible, the side chambers from the plenum chamber.

Said side areas, 34, 35, 38 and 39, become pressurized chambers and are closed except for operator controls to open pressure relief outlets, 64, 65, 68 and 69, positioned at the sides of the chambers at points near the limits of the tilt capabilities of the respective wheel, allowing the chambers to be opened separately at the said outlets and pressures in excess of atmospheric would be allowed to escape through this venting into the atmosphere.

Opening a vent to permit escape of the pressure causes air movement within and relative pressure differences between the chambers opposing each other at the sides of either wheel. If only one of the vents on either side of the wheel is opened, air pushes upon the wheel as it rushes past, into the lower pressure region and thus pneumatically shifts the position of the wheel in regards to the relative pressure differences. The chambers are not air tight to each other, due to the thin but constant space separating the tires from contact with the outer shell, however, between the tire and the closely fitted outer shell around the tire, which forms the outer wall of the pressurized chambers at the sides of the wheels, enough relative pressure difference is present due to the massive air flow created by the fan and motor means to swiftly and easily cause a wheel to be drawn left or right in a tilting fashion when pressure is released from one of the release valves at the sides.

If valves are opened equally at both sides of a wheel simultaneously, the net effect is no tilting action, only the air cushioned platform is effected in that total pressure is lost which would normally be directed against the support surface through the skirted plenum chamber. Therefore the craft will lose a degree of lift in proportion to the amount of fluid pressure lost by opening said release valves, causing the craft to lose altitude, bringing the wheel into closer proximity to the support surface, or if contacting the support surface, effectively lowers the body of the air cushioned platform, thereby the hub of the wheel is lowered, bringing the wheel down and thereby creating positive downward forces to the tire, pressing it against the support surface, 10.

Turn now your attention to FIG. 6. The present invention manifests itself in a tractor and trailer combination vehicle, hitched together by a cup hitch, 71, on the tractor air cushioned platform, 3, face downward over a ball, 72, which leads the trailer air cushioned platform, 23.

The tractor air cushioned platform and body shell, 3, houses the wheel of the first mode as described, and the trailer air cushioned platform also being a body shell, 23, houses the wheel of the second mode as described.

The operator of the combination vehicle rides upon a seat, 9, positioned upon the trailer vehicle, 23, at the steering handlebar, 8, and controls pressure release linkages, 74, 75, 78 and 79, and power controls of the drive motor of the wheel of the first mode being a twist throttle, 76, on the right handlebar, and a foot throttle, 77, of the motor and fan means, 55, providing fluid pressure to power both tractor and trailer air cushions.

APPENDIX

Calculus and Analytical Geometry 7th Edition Thomas Finney, Addison Wesley Press 1988 pgs. 545=548
Precalculus 2nd Edition David Cohen, West Publishing 1987 Pgs. 558,565
C.R.C. Handbook of Mathematical Sciences, 6th Edition William Beyer, C.R.C. Press, 1987 Pgs. 157, 290, 669, 675
Introduction to Geometry, 2nd Edition H.S.M. Coxeter, John Wiley and Sons, Inc. 1969 Pgs. 116-118, 319
Mathematics Dictionary, 4th Edition James and James, Van Nostrand Reinhold Company 1976 Pgs. 275-277
Webster's New World Dictionary of Mathematics Wm. Karush 1989 Pgs. 186-187, 272-273
A Dictionary of Mathematics Glenn and Gittler, Harper and Row, 1984 Pgs. 33-34, 89, 146, 208, 227

Having thus described the novel tractor and trailer air cushioned vehicle, I claim:

1. A guidance system for an air cushioned vehicle comprising:
   an air cushioned platform,
   a half torus hub mounted on said platform,
   a traction wheel, having a left and a right side, rotatable about said hub, wherein an inner surface of said wheel tilts about an outer surface of said hub,
   a closely fitted outer shell mounted on said platform substantially concentric with said hub,
   wherein left and right pressurized chambers are defined by said hub, said shell and a respective side of said wheel, and wherein said chambers are pressurized by air pressure generated by said air cushioned platform,
   said vehicle further comprising a left and a right pressure relief valve operable with each of said chambers wherein upon opening at least one of said valves, said wheel is drawn to a tilted position resulting from relative pressure differences within said chambers.

2. A guidance system according to claim 1 wherein said vehicle further comprises;
   a rim, having a left and a right side, supporting said traction wheel having an inner surface with a continuous series of curved gear teeth,
   a cradle base within said hub,
   roller bearings located at a base of said hub on each side of said wheel wherein said wheel is held laterally with respect to said base of said hub by said roller bearings,
   supporting shafts supporting said roller bearings and extending from said cradle, through a plurality of lateral hub slits in said hub and adjacent to said sides of said rim,
   a drive sprocket and a steering sprocket, said sprockets mounted upon said cradle, meshing with said gear teeth through a plurality of lateral cradle slits in said cradle, wherein said drive and said steering sprockets are substantially synchronized,
   a steering linkage operable with said steering sprocket, wherein said cradle base rides within said hub corresponding to tilting movement of said rim being held relative to said cradle by said supporting shafts and said roller bearings, and said wheel is driven by said drive sprocket, wherein an operator may steer said wheel by adjusting an alignment of said steering sprocket upon said curved teeth via said linkage, causing twisting forces to exert upon said rim, thereby turning said wheel of said vehicle.

3. A guidance system for an air cushioned vehicle comprising:
   an air cushioned platform,
   a spherical hub,
   a wheel, having a left and a right side, rotatable about said hub,
   roller bearings located on the equator of said hub on each side of said wheel wherein said wheel is held laterally with respect to said hub by said roller bearings,
   a closely fitted outer shell mounted on said platform substantially concentric with said hub, and
   a plurality of dividers between said hub and said wheel on the equator of said hub,
   wherein left and right pressurized chambers are defined by said hub, said shell, one of said dividers and a respective side of said wheel, and wherein said chambers are pressurized by air pressure generated by said air cushioned platform,
   said vehicle further comprising a left and a right pressure relief operable with each of said chambers wherein upon opening at least one of said valves, said wheel is drawn to a tilted position resulting from relative pressure differences within said chambers.

4. A guidance system according to claim 3 wherein a portion of said hub below the equator of said hub is removed to allow vehicle clearance as said wheel is tilted.

* * * * *